E. P. Russell,
Nut Wrench.
Nº 82,994. Patented Oct. 13, 1868.

Witnesses:
N. B. Smith
C. W. Smith

Inventor:
E. P. Russell

United States Patent Office.

EDWIN P. RUSSELL, OF MANLIUS, NEW YORK.

Letters Patent No. 82,994, dated October 13, 1868.

IMPROVEMENT IN WRENCH.

The Schedule referred to in these Letters Patent and making part of the same.

*To all whom it may concern:*

Be it known that I, EDWIN P. RUSSELL, of the town of Manlius, in the county of Onondaga, and State of New York, have invented a new and improved Adjustable Wrench; and I do hereby declare that the following is a full, clear, and exact description of the same, and the form thereof, when complete and ready for use, reference being had to the annexed drawings, making a part of this specification, in which—

The letters used represent corresponding parts wherever they occur.

Figure 4:
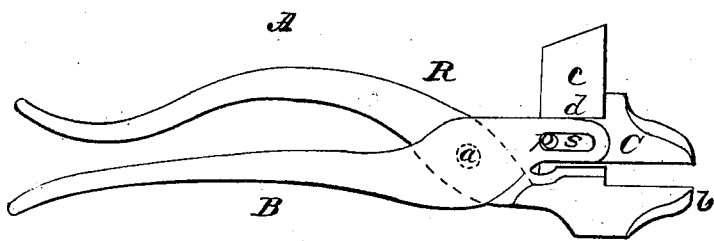
Figure 4 represents the parts together.
Figure 1:
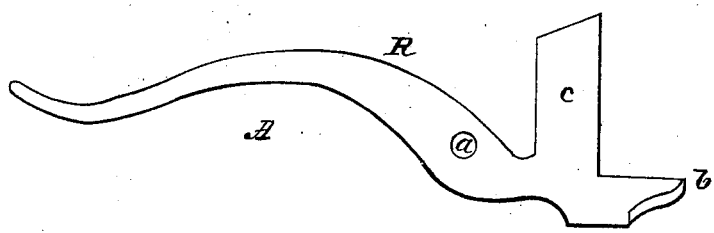
Figure 1 represents one of the lever-handles, with the stationary jaw, and a tongue for the movable jaw to operate upon.
Figure 2:
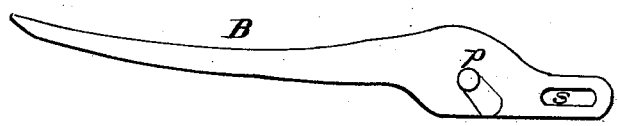
Figure 2 represents the other lever-handle inverted, with the pin thereon for the joint, and an elongated slot near the end, to be used in operating the movable jaw.
Figure 3:
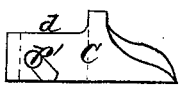
Figure 3 represents the movable jaw.

To enable others skilled in the art to make and use my invention, I will proceed to describe the same.

I make the whole of iron or any suitable metal.

The lever A is made in any common form, so shaped as to be easily operated by the hand, and curved at or near the joint $a$, and with the stationary jaw $b$ in common form, and the tongue $c$ of sufficient size and strength to receive the slide $d$ of the movable jaw, these parts to be all made in one piece.

I make the other lever B, in like common form, with the pin $p$ to hold the joint with the other lever, at $a$, and with an elongated slot, $s$, to receive the pin $p'$ on the movable jaw.

The movable jaw C is made with the slot or slide $d$, to operate upon the tongue $c$, and with the pin $p'$ to operate in the slot $s$.

The whole wrench is thus made in three pieces only, and when the pin $p$ is riveted down, the parts are all held in place, and operate as desired.

What I claim as my invention, and desire to secure by Letters Patent, is—

The jaw C, when operated upon the tongue $c$, by means of the lever B, the pin $p'$, and the slot $s$.

E. P. RUSSELL.

Witnesses:
N. B. SMITH,
C. W. SMITH.